United States Patent
Ahmed et al.

(10) Patent No.: US 9,857,540 B2
(45) Date of Patent: Jan. 2, 2018

(54) STRAIN RELIEF BOOT AND FIBER OPTIC CABLE ASSEMBLY INCLUDING THE SAME

(71) Applicant: Corning Optical Communications LLC, Hickory, NC (US)

(72) Inventors: Izhar Zahoor Ahmed, Cupertino, CA (US); Brandon Andrew Barnes, Fort Worth, TX (US); Ashley Wesley Jones, Denton, TX (US); Nikhil Baburam Vasudeo, Pune (IN)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/418,971

(22) Filed: Jan. 30, 2017

(65) Prior Publication Data

US 2017/0235063 A1 Aug. 17, 2017

Related U.S. Application Data

(60) Provisional application No. 62/295,656, filed on Feb. 16, 2016.

(51) Int. Cl.
*G02B 6/38* (2006.01)
*G02B 6/44* (2006.01)

(52) U.S. Cl.
CPC ......... *G02B 6/3887* (2013.01); *G02B 6/3821* (2013.01); *G02B 6/3893* (2013.01); *G02B 6/4402* (2013.01)

(58) Field of Classification Search
None
See application file for complete search history.

(56) References Cited

U.S. PATENT DOCUMENTS

| 4,461,529 A * | 7/1984 | Fariss | B29C 65/4895 264/260 |
|---|---|---|---|
| 4,795,229 A | 1/1989 | Abendschein et al. | |
| 5,329,603 A | 7/1994 | Watanabe et al. | |

(Continued)

FOREIGN PATENT DOCUMENTS

| GB | 2247996 A | 3/1992 |
|---|---|---|
| JP | 5-297246 A | 11/1993 |
| JP | 2010113302 | 5/2010 |

OTHER PUBLICATIONS

International Search Report and Written Opinion PCT/US2017/016879 dated Apr. 3, 2017.

(Continued)

*Primary Examiner* — Mike Stahl
(74) *Attorney, Agent, or Firm* — Adam R. Weeks

(57) ABSTRACT

A strain relief boot and a fiber optic cable assembly are described. The strain relief boot has a first conduit made of at least a first material. The first conduit has a front segment and a rear segment. The rear segment includes at least one discontinuity to make the rear segment more flexible than the front segment. The rear segment also includes at least one projection extending outwardly from the rear segment at a location adjacent to the at least one discontinuity. The strain relief boot also has a second conduit made from at least a second material that is less rigid than the first material. The second conduit at least partially surrounds at least the rear segment of the first conduit and extends rearwardly of the first conduit.

22 Claims, 6 Drawing Sheets

(56) References Cited

U.S. PATENT DOCUMENTS

| | | | |
|---|---|---|---|
| 5,461,690 A * | 10/1995 | Lampert | G02B 6/3807 385/100 |
| 5,739,472 A * | 4/1998 | Buck | H01R 13/562 174/107 |
| 5,781,681 A | 7/1998 | Manning | |
| 5,892,871 A | 4/1999 | Dahan et al. | |
| 6,137,056 A | 10/2000 | Miyazaki | |
| 6,672,774 B2 * | 1/2004 | Theuerkorn | G02B 6/3887 385/86 |
| 7,361,838 B2 * | 4/2008 | Kuo | H01R 13/5804 174/74 R |
| 9,551,842 B2 | 1/2017 | Theuerkorn | |
| 2002/0181893 A1 | 12/2002 | White et al. | |
| 2008/0025670 A1 * | 1/2008 | Castagna | G02B 6/4478 385/69 |
| 2009/0196553 A1 | 8/2009 | Anderson et al. | |
| 2010/0193220 A1 | 8/2010 | Prasad et al. | |
| 2010/0202748 A1 | 8/2010 | Pierce et al. | |
| 2012/0064763 A1 | 3/2012 | Radzik et al. | |
| 2013/0084740 A1 * | 4/2013 | Paynter | B29C 45/14598 439/604 |
| 2013/0322826 A1 * | 12/2013 | Henke | G02B 6/3834 385/60 |
| 2014/0273620 A1 | 9/2014 | Burris | |
| 2014/0328560 A1 | 11/2014 | Ahmed et al. | |
| 2016/0209602 A1 * | 7/2016 | Theuerkorn | G02B 6/3887 |

OTHER PUBLICATIONS

European Search Report for EP16186788.2 dated Feb. 7, 2017; 9 Pages; European Patent Office.

* cited by examiner

STRAIN RELIEF BOOT AND FIBER OPTIC CABLE ASSEMBLY INCLUDING THE SAME

PRIORITY APPLICATIONS

This application claims the benefit of priority of U.S. Provisional Application Ser. No. 62/295,656, filed on Feb. 16, 2016, which is incorporated by reference herein in its entirety.

BACKGROUND

This disclosure generally relates to cable assemblies and components thereof, for example fiber optic cable assemblies. More particularly, the present disclosure relates to strain relief boots for use as part of fiber optic cable assemblies to control the bend radius of the cable, for example in the area adjacent to a connector.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization may be done in a factory, resulting in a "pre-connectorized" or "pre-terminated" fiber optic cable, or the field (e.g., using a "field-installable" fiber optic connector).

Regardless of where installation occurs, a fiber optic connector typically includes a housing and a connector body of a relatively rigid material so that the fiber optic connector can withstand a variety of forces during handling and use without affecting the optical connection that may be or has been established. Having rigid components, however, presents design challenges elsewhere. For example, fiber optic cables upon which fiber optic connectors are installed are typically much less rigid than the connector bodies of the fiber optic connectors. The rapid transition in stiffness may result in stress concentrations where the cable meets the connector body. Radial loads applied to the cable may then result in the cable bending (e.g., where the stresses are concentrated) beyond a minimum bend radius that should not be exceeded in order for the cable to function properly.

To address the above-mentioned challenge, a fiber optic connector typically includes a flexible, strain-relief boot that attaches onto a rigid portion of the fiber optic connector (e.g., the housing or connector body) and extends rearwardly over a portion of the cable. The strain relief boot provides a transition in stiffness between the fiber optic connector and the cable.

The strain relief boot is provided to minimize possible strain on the cable that may result if the cable is bent to too sharp of an angle at or near the connector. With respect to fiber optic cables, strain relief boots help maintain a sufficiently large bend radius in the area adjacent to the connector in order to minimize attenuation of light traveling along the optical fiber(s). In addition to reducing signal attenuation, strain relief boots inhibit damage to the data or energy transmission elements within the cable that could be damaged by repeated bending of the cable where the cable enters the connector.

There is a need for a new strain relief boot that provides desired bend control capabilities across a range of cable diameters. There is also a need for a new strain relief boot that includes fewer components to reduce installation decisions and operations, thus simplifying the installation process.

SUMMARY

The present disclosure describes embodiments of a strain relief boot configured to use with fiber optic connectors and fiber optic cables as part of a fiber optic cable assembly. The strain relief boots of the present disclosure are designed to provide a desired degree of bend control while being useful in combination with fiber optic cables across a range of cable diameters. For example, the strain relief boot may be suitable for larger cables generally provided with strength members, as well as small cables that are not generally provided with strength members. Further the embodiments of the strain relief boot described herein may reduce installation decisions and operations by including fewer components that other conventional strain relief, thus simplifying the installation process.

An embodiment of the present disclosure includes a strain relief boot for a fiber optic cable. The strain relief boot comprises a first conduit comprising at least a first material. The first conduit includes a front segment and a rear segment. The rear segment comprises at least one discontinuity configured such that the rear segment is more flexible than the front segment. The rear segment also comprises at least one projection extending outwardly from the rear segment at a location adjacent to the at least one discontinuity. The strain relief boot further comprises a second conduit comprising at least a second material, the second conduit at least partially surrounding at least the rear segment of the first conduit, and the second conduit extending rearwardly of the first conduit. In this embodiment, the first material is more rigid than the second material.

In some embodiments, the front segment of the first conduit has a first outer width and the rear segment has a second outer width that is less than the first outer width. Embodiments are also possible, however, where the second outer width is the same as or greater than the first outer width.

In another embodiment, the present disclosure includes a fiber optic cable assembly comprising a fiber optic connector having a ferrule aligned along a longitudinal axis, a strain relief boot attached to an end of the fiber optic connector, and a fiber optic cable passing through the strain relief boot and attached to the fiber optic connector, the fiber optic cable having a diameter within the range from about 900 μm to about 2.9 mm. The strain relief boot may further comprise a first conduit comprising at least a first material, and a second conduit comprising at least a second material. The second conduit is attached to and at least partially surrounds the first conduit. The first material is more rigid than the second material. The strain relief boot is configured to maintain at least a 10 mm bend radius in the fiber optic cable when the fiber optic cable is subject to at least 0.5 lbf perpendicular to the longitudinal axis.

In another embodiment, the present disclosure includes a fiber optic cable assembly comprising a fiber optic connector having a ferrule aligned along a longitudinal axis, a strain relief boot attached to an end of the fiber optic connector, and a fiber optic cable passing through the strain relief boot and attached to the fiber optic connector, the fiber optic cable having a diameter less than about 1.6 mm. The strain relief boot further comprises a first conduit comprising at least a first material, and a second conduit comprising at least a second material. The second conduit is attached to and at least partially surrounds the first conduit. The second conduit has an inner width that is at least about 2.9 mm, and the first material is more rigid than the second material. The strain relief boot is configured to maintain at least a 10 mm bend radius in the fiber optic cable when the fiber optic cable is subject to at least 0.5 lbf perpendicular to the longitudinal axis.

Other embodiments include a strain relief boot having a longitudinal axis, the strain relief boot configured for attachment to a fiber optic cable assembly that includes a fiber optic cable attached to a fiber optic connector. The strain relief boot comprises a first conduit having at least a first material and a second conduit having at least a second material. The second conduit is attached to and at least partially surrounds the first conduit, and the first material is more rigid than the second material. The strain relief boot is configured to maintain at least a 10 mm bend radius in the fiber optic cable when: the strain relief boot is attached to the fiber optic cable assembly; the fiber optic cable has a diameter of about 900 μm; and the fiber optic cable is subject to about 0.5 lbf perpendicular to a longitudinal axis of the fiber optic connector. The strain relief boot is also configured to maintain at least a 10 mm bend radius in the fiber optic cable when: the strain relief boot is attached to the fiber optic cable assembly; the fiber optic cable has a diameter of about 2.9 mm; and the fiber optic cable is subject to about 4.4 lbf perpendicular to the longitudinal axis of the fiber optic connector.

Still other embodiments include a strain relief boot for a fiber optic cable. The strain relief boot comprises a first conduit comprising at least a first material. The first conduit includes a front segment having an outer width and a rear segment having an outer width that is less than the outer width of the front segment. The rear segment includes a plurality of holes extending along a length of the rear segment. The strain relief boot also includes a second conduit comprising at least a second material that is less rigid than the first material. The second conduit surrounds at least the rear segment of the first conduit. The second conduit extends rearwardly of the first conduit. The second conduit includes a plurality of protrusions respectively extending into the plurality of holes.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

DESCRIPTION

Various embodiments will be further clarified by examples in the description below. As an example, this description generally relates to a strain relief boot as well as fiber optic connectors and fiber optic cable assemblies that include the strain relief boot. The strain relief boot may be configured to maintain a sufficiently large bend radius in an area adjacent to the connector and may include fewer loose parts than prior boots to reduce installation decisions and operations, thus simplifying the installation process.

Figure 1:
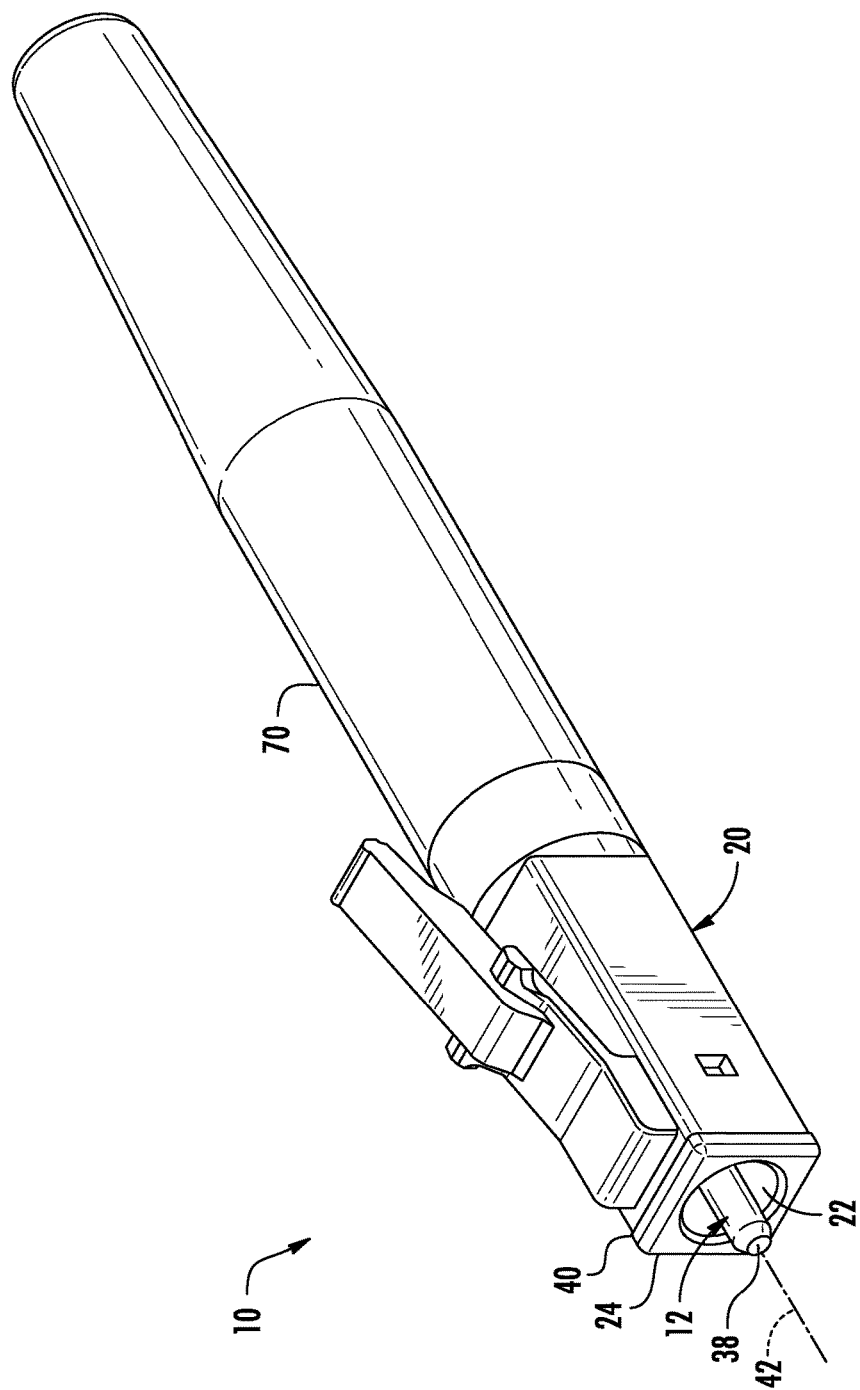
FIG. 1 is a perspective view of an example of a fiber optic connector.
Figure 2:
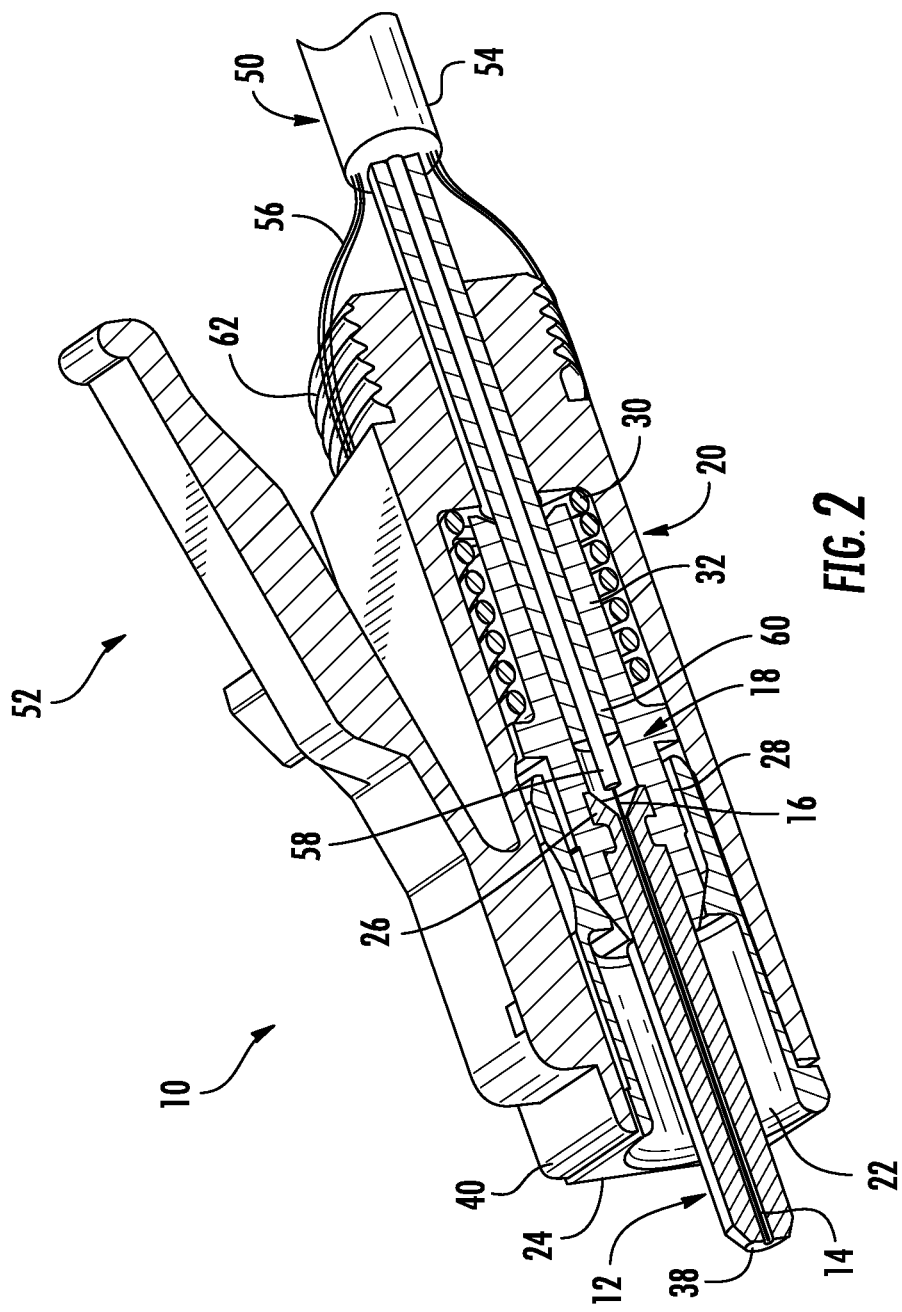
FIG. 2 is a cross-sectional perspective view of the fiber optic connector of FIG. 1 installed onto a fiber optic cable and combined with a strain relief boot, in accordance with an embodiment of this disclosure.

One example of a fiber optic connector 10 (also referred to as "optical connector 10", or simply "connector 10") is shown in FIGS. 1 and 2. Although the connector 10 is shown in the form of a LC-type connector, the features described below may be applicable to different connector designs, including at least SC and ST-type connectors, for example, and other single-fiber or multi-fiber connector designs.

As shown in FIGS. 1 and 2, the connector 10 includes a ferrule 12 having a ferrule bore 14 ("micro-hole") configured to support an optical fiber 16, a ferrule holder 18 from which the ferrule 12 extends, and a housing 20 (also referred to as "connector body 20") having a cavity 22 in which the ferrule 12 and ferrule holder 18 are received. The ferrule holder 18 is retained within the housing 20 by a cap 24. More specifically, a back end 26 of the ferrule 12 is received in a first portion 28 of the ferrule holder 18 and is secured therein in a known manner (e.g., press-fit, adhesive, and/or molding the ferrule holder 18 over the back end 26 of the ferrule 12, etc.). The ferrule 12 and ferrule holder 18 may even be a monolithic structure in some embodiments. For convenience, the term "ferrule assembly" may be used to refer to the combination of the ferrule 12 and ferrule holder 18, regardless of whether these elements are separate components secured together or different portions of a monolithic structure.

The ferrule holder 18 is biased to a forward position within the housing 20 by a spring 30, which extends over a second portion 32 of the ferrule holder 18 that has a reduced cross-sectional diameter/width compared to the first portion 28. The spring 30 also interacts with internal geometry of the housing 20. The cap 24 is secured to the housing 20 and limits forward movement of the ferrule holder 18, thereby retaining the ferrule holder 18 within the housing 20.

When the connector 10 is assembled as shown in FIG. 1, a front end 38 of the ferrule 12 projects beyond a forward end 40 of the housing 20 and the cap 24. The front end 38 presents the optical fiber 16 for optical coupling with a mating component (e.g., another fiber optic connector; not shown). The ferrule 12 aligns the optical fiber 16 along a longitudinal axis 42. These aspects can be better appreciated with reference to FIG. 2, which shows how a fiber optic cable 50 (hereinafter "cable 50") including the optical fiber 16 can be terminated with the connector 10. In other words, the connector 10 can be installed on the cable 50 to form a fiber optic cable assembly 52. The cable 50 shown in FIG. 2 is merely an example; other suitable fiber optic cables are within the scope of this disclosure. In the embodiment shown, the cable 50 includes a jacket 54, strength members 56 in the form of aramid yarn, and the optical fiber 16, which itself is surrounded by a coating 58 and a buffer layer 60 ("tight buffer"). Portions of the jacket 54 have been removed from the optical fiber 16 to expose the strength members 56, which are cut to a desired length and placed over a rear portion 62 of the housing 20. The strength members 56, when present, may be coupled to the housing 20 by a strain relief boot 70 (hereafter "boot 70"; shown in FIG. 1 but not FIG. 2), as will be discussed below.

Variations of these aspects will be appreciated by persons skilled in the design of fiber optic cable assemblies. Reiterating from above, the embodiment shown in FIGS. 1 and 2 is merely an example of a fiber optic connector 10 that may be used in connection with the devices and methods described below. The general overview has been provided simply to facilitate discussion; the present disclosure is also applicable to other types of fiber optic connectors and fiber optic cable assemblies.

Figure 3:
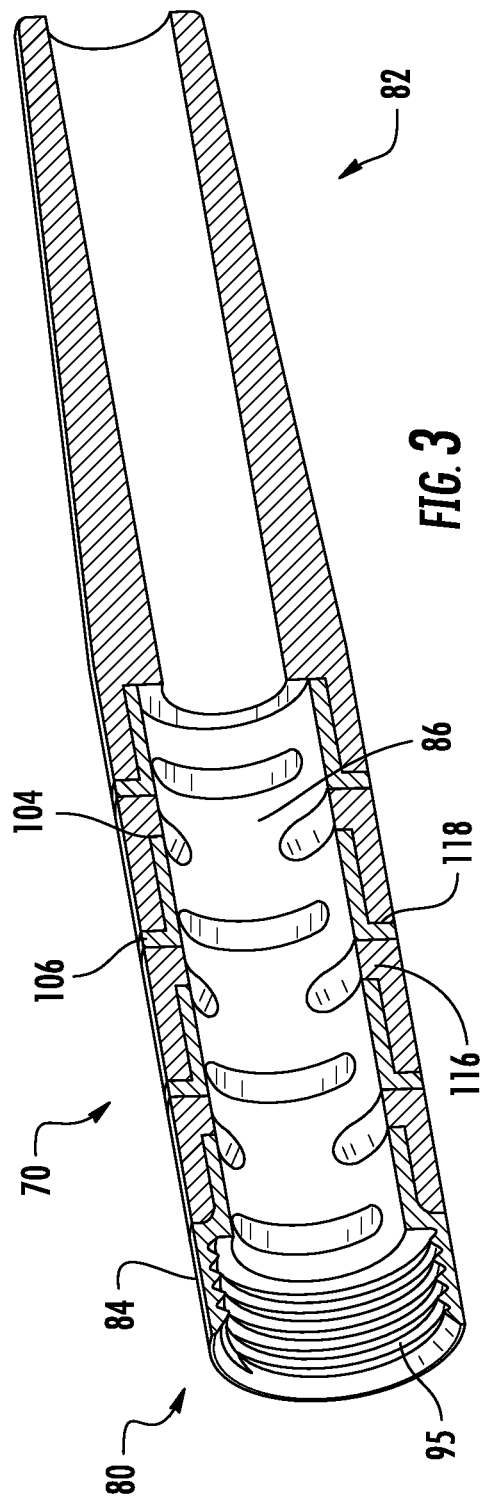
FIG. 3 is a cross-sectional elevation view of the strain relief boot of FIG. 2.
Figure 4:
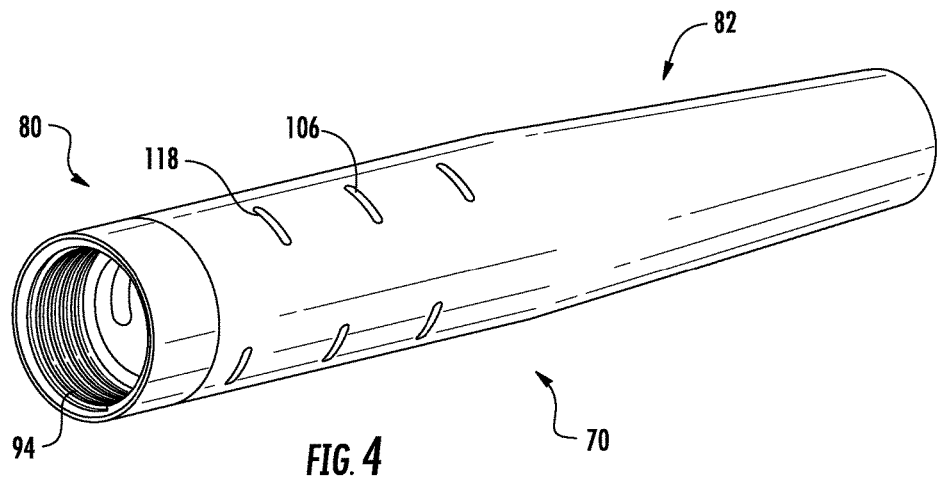
FIG. 4 is a perspective view of the strain relief boot of FIG. 2.

FIGS. 3 and 4 illustrate an embodiment of the strain relief boot 70 for the connector 10. The boot 70 is configured to at least partially surround a portion of the cable 50 (FIG. 2) where the cable enters the connector 10. The boot 70 may be attached to the cable, for example by way of connection with the strength members 56, or the boot may "float" around the cable 50. The boot 70 comprises a substrate 80 made from a first material and a sleeve 82 that at least partially surrounds at least a portion of the substrate 80. The sleeve 82 is made from a second material. The first material used to construct the substrate 80 should be more rigid than the second material used to construct the sleeve 82. In this way, the substrate 80 is able to at least partially structurally support the sleeve 82. The boot 70 may therefore be a single component formed by injection molding the sleeve 82 onto the substrate 80. By molding the sleeve 82 onto the substrate 80, adherence between the substrate and the sleeve may be improved, which may increase the performance of the boot 70 as a whole. As discussed further below, adherence may be supported by intermingling of portions of the sleeve 82 with portions of the substrate 80 during or as a result of the molding process. In other embodiments, the substrate 80 may be press fit into at least a portion of the sleeve 82 or otherwise secured or coupled to the sleeve.

Figure 5:
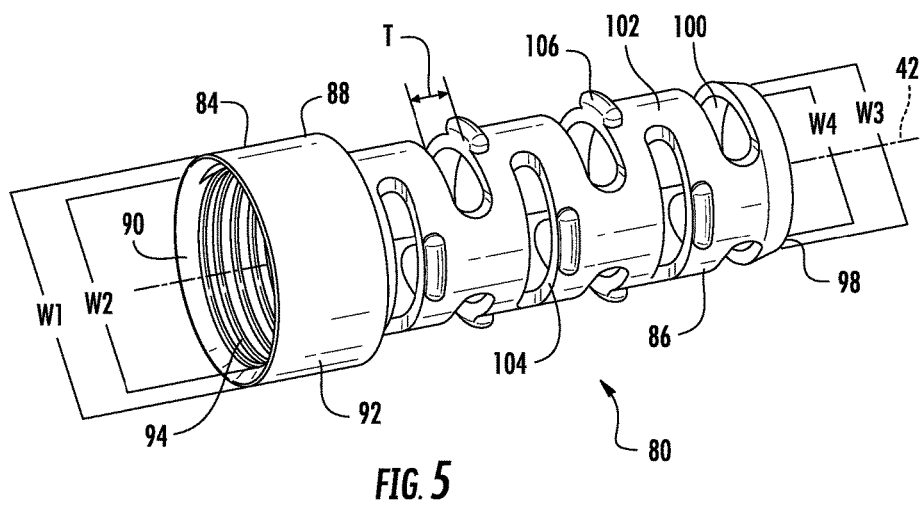
FIG. 5 is a perspective view of a substrate of the strain relief boot of FIG. 2.

An embodiment of the substrate 80 may be best seen in FIGS. 3-5. The substrate 80 may be molded or otherwise formed from a relatively rigid material, such as a relatively rigid, or substantially rigid, polymer. Examples of suitable polymers may include polyetherimides sold under the trade name ULTEM™, or polycarbonate such as sold under the trade name LEXAN™. In some embodiments, metals or alloys, such as aluminum, nickel silver, brass, or the like may be used to form the substrate 80.

The substrate 80 may be in the form of a conduit. The substrate 80 may include a front segment 84 configured to attach to the connector 10, particularly the housing 20. The substrate 80 may also include a rear segment 86 extending from the front segment 84. The front segment 84 has a peripheral wall 88 with an inner surface 90 and an outer surface 92. The inner surface 90 at least partially defines a lumen through which the cable 50 is configured to pass. The front segment 84 has an outer width W1 defined by the outer surface 92 and an inner width W2 defined by the inner surface 90. In the illustrated embodiment, the front segment 84 is cylindrical such that the outer width W1 is substantially constant and may be referred to as an outer diameter. The maximum outer width W1 may be about or less than about 6.25 mm, about or less than about 6.0 mm, or even about or less than about 5.8 mm. Such outer widths W1 have the advantage of keeping the boot sufficiently small to allow the connector 10 to be used in common duplex configurations (e.g., LC duplex configuration). In other embodiments, the maximum outer width W1 may be greater than 6.25 mm. Additionally, the front segment 84 is not necessarily limited to cylindrical shapes, and the outer width W1 may taper along a longitudinal axis of the boot 70 that corresponds to the longitudinal axis 42 (FIG. 1) when the boot 70 is attached to the connector 10. The front segment 84 may also have a transverse cross-sectional profile perpendicular to the longitudinal axis 42 that is or is not circular. In other words, the lumen, which is at least partially defined by the inner surface 90, may have a non-circular profile. If this profile is not circular, i.e. where a width is not equal to a diameter, the width may be the largest dimension perpendicular to the longitudinal axis 42. The inner width W2 may be approximately 3.9 mm but is expected to be selected based on the size of the housing 20 (FIGS. 1 and 2) or another portion of the connector 10 to which the substrate 80 is configured to be attached.

The inner surface 90 of at least the front segment 84 may include one or more helical threads 94 or the like (e.g. internal threads). The threads 94 may assist with attachment of the boot 70 to the connector 10 as the boot is installed over the rear portion 62 of the housing 20, which may include corresponding threads (e.g. outer threads). As such, the boot 70 may be configured to screw onto the connector 10. When the cable 50 includes aramid yarns, or similar strength members 56, such as often found on round cables having a diameter within the range of about 1.6 mm to about 2.9 mm, the aramid yarns may be trapped with the threads 94 against an outside surface of the rear portion 62 of the housing 20. The use of integrated threads 94 within the front segment 84, which are made from a relatively rigid material, may provide yarn capture and the related strain relief without requiring a crimp ring as found in some other connectors. When a crimp ring is not present, an installer may be able to complete the cable assembly 52 without the use of a corresponding crimp tool to deform the crimp ring. Nevertheless, in other embodiments, the boot 70 may be used with a connector that includes a crimp ring or other mechanism for securing the cable 50 to the connector.

Still referring to FIGS. 3-5, the rear segment 86 of the substrate 80 includes a peripheral wall 98 having an inner surface 100 and an outer surface 102. The outer surface 102 of the rear segment 86 may define an outer width W3, and the inner surface 100 may define an inner width W4. Generally it is expected that the outer width W1 of the front segment 84 will be greater than the outer width W3 of the rear segment 86. Having outer width W1 greater than outer width W3 allows room to accommodate the sleeve 82 around the outside of the rear segment 86. Outer width W3 may be about 4.6 mm in some of the embodiments where the outer width W1 is about or greater than about 5.8 mm. The inner width W2 of the front segment 84 may be greater than, equal to, or even less than the inner width W4 of the rear segment 86. The rear segment 86 may be cylindrical (i.e., having a circular cross section perpendicular to the longitudinal axis 42) or may have a non-circular profile. The outer surface 102 may be un-tapered to provide a consistent outer width W3, or the outer width W3 may taper along the longitudinal axis 42 of the boot 70.

In the embodiment shown, the rear segment 86 includes discontinuities 104 at spaced apart locations along the length of the rear segment and/or at spaced apart locations around the circumference thereof. The presence of the discontinuities 104 reduces the stiffness of the rear segment 86 to enhance or provide at least some ability for bending/flexibility. At the same time, the discontinuities 104 may help to control the maximum degree of bending. In the illustrated example of FIGS. 3-5, the discontinuities 104 are holes in the form of elongated radial slots that extend through the peripheral wall 98 of the rear segment 86. Each of the slots may extend partially around the circumference of the rear segment 86, transverse to the longitudinal axis 42. A slot may control bending when the opposite edges of each slot contact one another or become closer to one another as the rear segment 86 is bent. Each slot may extend around more than one-quarter, but less than one-half of the circumference of the rear segment 86. The slots may be arranged in pairs on opposite sides of the circumference. An adjacent pair of slots may be rotationally positioned, for example by 90 degrees, around the circumference relative to an initial pair of slots. The thicknesses T or widths of the slots along the longitudinal direction may be the same, or these dimensions may vary as a function of the location of the slots along the length of the rear segment 86.

Figure 6:
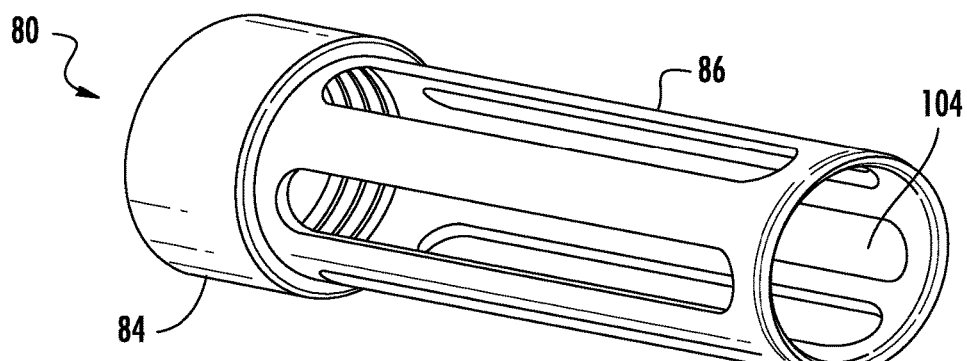
FIG. 6 is a perspective view of a substrate according to another embodiment.
Figure 7:
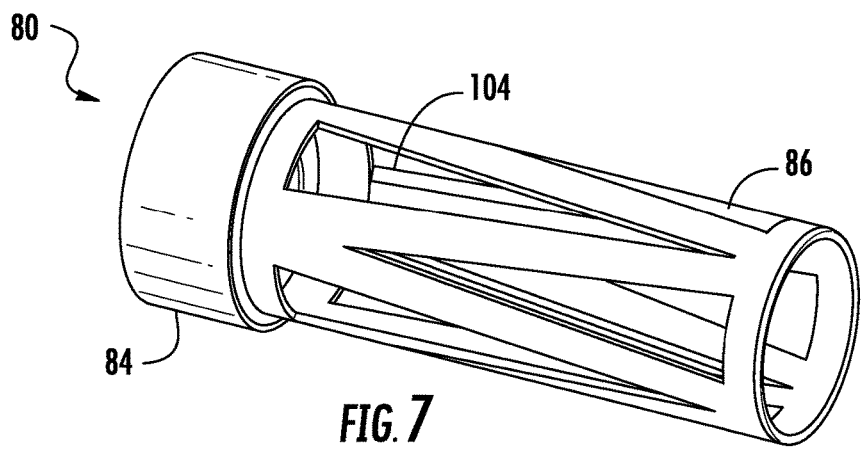
FIG. 7 is a perspective view of a substrate according to a further embodiment.
Figure 8:
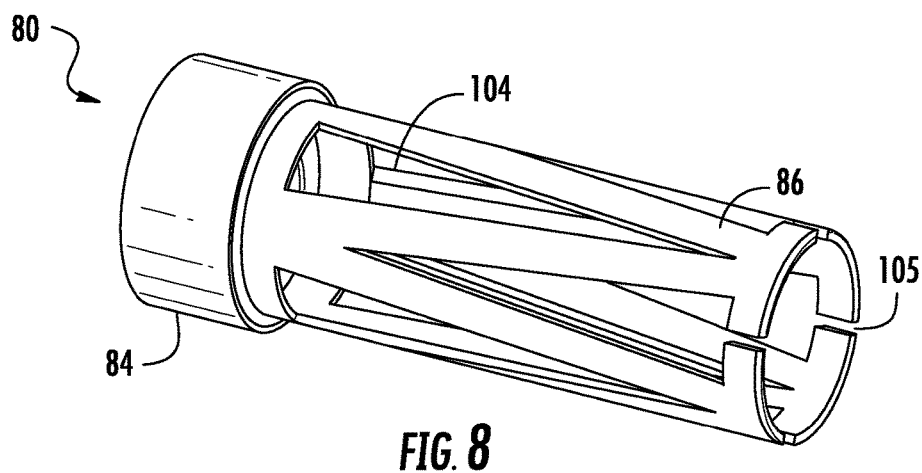
FIG. 8 is a perspective view of a substrate according to yet another embodiment.

FIGS. 6-8 are perspective views of alternative embodiments of the substrate 80, each with discontinuities 104 (e.g. holes) of various shapes and arrangements in the rear segment 86. In the embodiment shown in FIG. 8, a rear end of the substrate 80 includes slits 105 in communication with the discontinuities 104, which may further refine the flexibility of the substrate 80.

Returning to the embodiment of the substrate 80 shown in FIGS. 3-5, the rear segment 86 may also include at least one projection 106 extending outwardly from the outer surface 102 of the rear segment. While not shown, projections 106 may be provided on the embodiments of the substrate 80 shown in each of FIGS. 6-8 as well. At least one, and perhaps each, of the projections 106 may be provided at a location proximate or adjacent to a corresponding discontinuity 104. One, some, or all of the discontinuities 104 may be contiguous with one or more corresponding projections 106. In the illustrated embodiment of FIGS. 3-5, the projections 106 have an elongated shape extending parallel with the slots that make up the discontinuities 104. In some embodiments, the projections 106 may extend from the outer surface 102 to a height sufficient to match the outer width W1 of the front segment 84. Put another way, the projections 106 may have a height substantially greater than or equal to a thickness of the sleeve 82 such that the projections 106 are visible from an outside of the sleeve. In one embodiment, the substrate 80 is about 14.3 mm long with twelve discontinuities 104. The front segment 84 may be about 2.55 mm long.

As will be better understood after discussion of the sleeve 82, the discontinuities 104 and the projections 106 may increase the mechanical retention of the sleeve 82 upon the rear segment 86 of the substrate 80. In other words, the discontinuities 104 and the projections 106 are features configured to interlock with areas of the sleeve 82 to restrict any separation of the sleeve from the substrate 80.

Figure 9:
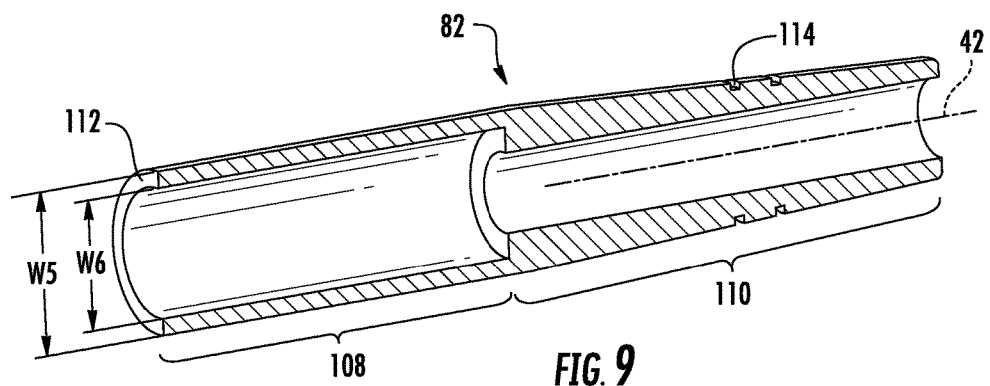
FIG. 9 is a cross-sectional perspective view of a sleeve of the strain relief boot of FIG. 2.

FIG. 9 shows the sleeve 82 in isolation, without protrusions 116 and holes 118 (discussed below with reference to FIGS. 3 and 4) to simplify matters. The sleeve 82 may be a conduit for fitting around the cable 50 (FIG. 2), and may be constructed from a generally elastomeric material that is relatively soft and pliable (e.g. less rigid) as compared to the substrate 80. A suitable material for the sleeve 82 includes an elastomer with a durometer between about 70 A and about 92 A.

The sleeve 82 may have a mounting portion 108 configured to engage (e.g. at least partially surround) the substrate 80, particularly the rear segment 86, and a tail portion 110 extending rearwardly from the mounting portion. A front end 112 of the sleeve 82 may have an outer width W5 optionally configured to correspond with the outer width W1 of the front segment 84 of the substrate 80 to provide a smooth transition along the boot 70 from the substrate 80 to the sleeve 82. A smooth outer surface may minimize the locations along the boot 70 that may be caught while running the cable assembly 52 in a data center or other environment. The outer width W5 or outer diameter of the sleeve 82 may be constant or may taper along the longitudinal axis 42, such as resulting in a minimum outer width of about 3.6 mm. The sleeve 82 may have an inner width W6, such as an inner diameter. The inner width W6 of the embodiment shown in FIG. 9 varies between the mounting portion 108 and the tail portion 110. In other embodiments, the inner width W6 may be constant or may steadily taper along a substantial length of the sleeve 82. Preferably (e.g., optionally) at no location should the inner width W6 be less than the diameter of the desired cables 50 intended for use with the boot 70. In one example, the inner width W6 is large enough to accept a 2.9 mm cable, such as by being about 3.0 mm. The sleeve 82 may be approximately 32.4 mm long. Minimizing the length of the sleeve 82 may be desirable if the desired bend radius control can be maintained. Sleeve lengths of at least between about 30 mm and about 36 mm have been contemplated. The total length of the boot 70, including both the substrate 80 and the sleeve 82, may be about 35.4 mm in one embodiment.

In some embodiments, the rear end of the sleeve 82 may include one or more channels 114 formed into the outer surface of the sleeve. The channels 114 may extend fully or partially around the circumference of the sleeve 82. The channels 114 may provide additional flexibility to the rear end of the boot 70 to help prevent a point of strain where the cable 50 enters the boot.

Returning to FIGS. 3 and 4, the sleeve 82 may be injection molded onto the substrate 80. As a result, the resin or other suitable molding material used to form the sleeve 82 may at least partially fill in the discontinuities 104 of the substrate 80, effectively forming a plurality of protrusions 116 extending into the lumen of the sleeve 82. The protrusions 116 may be considered as extending into the discontinuities 104 (e.g. holes) of the substrate 80. When the projections 106 are present on the substrate 80, the molding process may cause portions of the sleeve 82 to at least partially surround the projections 106, which may result in holes 118 at least partially though the thickness of the sleeve 82. Thus, the projections 106 of the substrate 80 may be considered as extending into the holes 118 of the sleeve 82. The resulting meshing of portions of the substrate 80 with portions of the sleeve 82 provides at least a mechanical bond or connection between the substrate 80 and the sleeve 82. This mechanical connection helps the boot 70 resist torsion that is the result of rotationally mounting the boot onto the rear portion 62 of the housing 20 by way of the threads 94.

Figure 10:
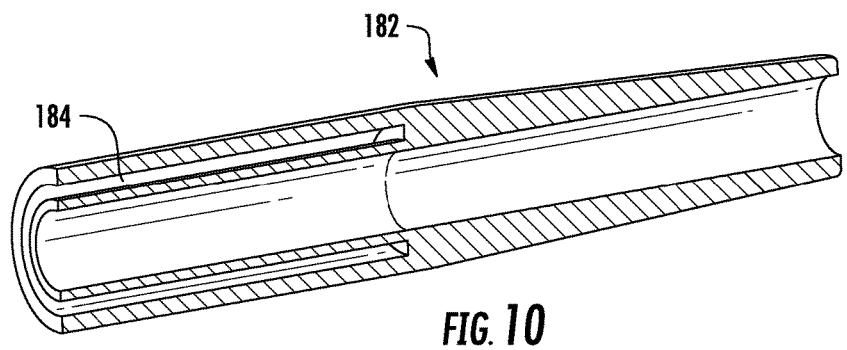
FIG. 10 is a cross-sectional perspective view of a sleeve of a strain relief boot according to another embodiment.

Turning to FIG. 10, an alternative sleeve 182 is shown. The sleeve 182 includes an annular groove 184. The sleeve 182 may be injection molded onto the substrate 80. Alternatively, the rear segment 86 of the substrate 80 may be pressed into the annular groove 184. Having a portion of the sleeve 182 on both the inside and outside of the rear segment 86 of the substrate 80 may further enhance contact between the two materials, further preventing material delamination due to loading (mechanical cycling under load, thermal/humidity loading, etc.).

Having described the structure of a boot 70 according to a variety of embodiments, some of the functional advantages will now be further described. The boot 70 is designed to control bend radius of the cable 50 where the cable enters the connector 10 (FIG. 2). By controlling bend radius, attenuation of light can be restricted as the light travels through the cable 50, particularly as light travels through the optical fiber 16. The boot 70 may be configured to be suitable for use with cables 50 across a range of sizes, such as round cables with diameters within the range of approximately 900 μm to approximately 2.9 mm, using the same sized boot. Use of a single boot 70 reduces the number of components handled during installation (e.g., by an installer or equipment), potentially making the installation easier and less subject to errors. The single boot 70 of the present disclosure is configured to provide sufficient stiffness to control bending of larger cables (e.g., 2.9 mm diameter), while being sufficiently flexible to inhibit attenuation of a signal traveling through smaller cables (e.g., 900 μm diameter) at a location where those cables enter the boot. In conventional designs, boots designed for larger cables may be too stiff for use with smaller cables, resulting in strain where the cable enters the boot. Additionally, conventional boots designed for smaller cables may use materials that are too flexible for sufficient bend control if used with larger cables.

As used herein, the bend radius of the cable 50 adjacent or proximate to the connector 10 is sufficiently controlled if the bend radius is maintained sufficiently large to substantially avoid bend-induced attenuation of a signal traveling within the cable. The bend radius required for avoiding bend-induced attenuation varies based upon the size and construction of the cable 50 and the optical fiber 16 therein. In some embodiments, maintaining a bend radius greater than or equal to 10 mm is sufficient for most commonly used, commercially-available optical fibers. In other embodiments, maintaining a bend radius greater than or equal to 7 mm is understood to substantially avoid attenuation, such as when a bend-insensitive optical fiber is used. The bend radius is measured when a predetermined cable is tested in accordance with Telecordia GR-326 or related specifications from the International Electrotechnical Commission (IEC). For example, if a 900 μm diameter cable is used, the bend radius is measured adjacent to the exit of the connector 10 (e.g., in the region at least partially covered by the boot 70) when a mass weighing 0.5 lbf is supported by the cable 50 as the connector is fixed in a horizontal position. The force of the mass is therefore applied perpendicular to the longitudinal axis 42 of the boot 70. In another example, if a 2.9 mm diameter cable is used, the bend radius is measured adjacent to the exit of the connector (e.g., in the region at least partially covered by the boot 70) with a mass of 4.4 lbf loading a portion of the cable so that the cable hangs from a horizontally disposed connector. In some embodiments, the same boot 70 may be able to maintain the bend radius at greater than 10 mm for cables that are as small as 250 μm, or even 125 μm in diameter when used in connection with a 900 μm fan-out/furcation tube.

Another advantage of the boot 70 of the present disclosure may be that the boot is designed to fully function without requiring geometric manipulation. For example, no part of the boot 70 is intended to be removed, added, or deformed by the end user in order for the boot to function as discussed. In another example, and reiterating from above, by integrating threads 94 as part of the boot 70, the boot is able to capture the strength members 56 without requiring the use of a deformed crimp ring. Therefore, connectors having a boot 70 as described herein may have relatively few components, again simplifying assembly and installation. Similarly, by having the boot 70 compatible with a wide range of cable sizes, the boot 70 may be configured to be attached to the connector 10, with or without capturing strength members 56, because strength members may not be present in cables 50 of every size within a useful range of the boot.

Embodiments of the present disclosure may be described in terms of a system or kit for creation of a fiber optic cable assembly, such as the fiber optic cable assembly 52 (FIG. 2). Such a kit may include a boot 70 or a plurality of identical boots, one or more connectors 10, and one or more cables 50. The connectors 10 may be a variety of types. The cables 50 may have a variety of sizes, e.g. outer diameters, each configured to be selectively combined with the connector 10 and the boot 70. The kit may be a packaged combination of elements or may be separate elements brought together. For example, the kit reinforces the ability for the boot 70 to be used with a range of cable sizes without requiring distinct boot configurations or sizes.

Those skilled in the art will appreciate that other modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A strain relief boot for a fiber optic cable, the strain relief boot comprising:
    a first conduit comprising at least a first material, the first conduit including a front segment and a rear segment, wherein the front segment of the first conduit has a first outer width and the rear segment has a second outer width that is less than the first outer width, the rear segment comprising:
        at least one discontinuity configured such that the rear segment is more flexible than the front segment, and
        at least one projection extending outwardly from the rear segment at a location adjacent to the at least one discontinuity; and
    a second conduit comprising at least a second material, the second conduit at least partially surrounding at least the rear segment of the first conduit, and the second conduit extending rearwardly of the first conduit, wherein the first material is more rigid than the second material.

2. The strain relief boot according to claim 1, wherein the front segment is substantially circular in cross section taken perpendicular to a longitudinal axis of the strain relief boot.

3. The strain relief boot according to claim 2, wherein the rear segment is substantially circular in cross section taken perpendicular to the longitudinal axis of the strain relief boot.

4. The strain relief boot according to claim 2, wherein the second conduit is substantially circular in cross section taken perpendicular to the longitudinal axis of the strain relief boot.

5. The strain relief boot according to claim 4, wherein at least a front portion of the second conduit has an outer diameter substantially the same as the first outer width of the front segment.

6. The strain relief boot according to claim 1, wherein the at least one discontinuity comprises a plurality of discontinuities spaced along a length of the rear segment of the first conduit.

7. The strain relief boot according to claim 6, wherein the first conduit has a longitudinal axis, and the plurality of discontinuities comprise elongated radial slots that are transverse to a longitudinal axis of the strain relief boot.

8. A strain relief boot for a fiber optic cable, the strain relief boot comprising:
   a first conduit comprising at least a first material, the first conduit including a front segment and a rear segment, the rear segment comprising:
      at least one discontinuity configured such that the rear segment is more flexible than the front segment, and
      at least one projection extending outwardly from the rear segment at a location adjacent to the at least one discontinuity; and
   a second conduit comprising at least a second material, the second conduit at least partially surrounding at least the rear segment of the first conduit, and the second conduit extending rearwardly of the first conduit, wherein the first material is more rigid than the second material;
   wherein:
      the at least one discontinuity comprises a plurality of discontinuities spaced along a length of the rear segment of the first conduit;
      the plurality of discontinuities comprises a plurality of holes extending along a length of the rear segment, and
      the second conduit includes a plurality of protrusions respectively extending into the plurality of holes.

9. The strain relief boot according to claim 8, wherein:
   the plurality of holes comprises a first plurality of holes;
   the plurality of protrusions comprises a first plurality of protrusions;
   the second conduit further includes a second plurality of holes;
   the rear segment further includes a second plurality of protrusions extending along the length of the rear segment; and
   the second plurality of protrusions respectively extend into the second plurality of holes.

10. The strain relief boot according to claim 1, wherein the first material is selected from the group consisting of polyetherimide, polycarbonate, aluminum, nickel silver, and brass.

11. A strain relief boot for a fiber optic cable, the strain relief boot comprising:
   a first conduit comprising at least a first material, the first conduit including a front segment and a rear segment, wherein the front segment of the first conduit comprises at least one helical thread on an inner surface thereof, the rear segment comprising:
      at least one discontinuity configured such that the rear segment is more flexible than the front segment, and
      at least one projection extending outwardly from the rear segment at a location adjacent to the at least one discontinuity; and
   a second conduit comprising at least a second material, the second conduit at least partially surrounding at least the rear segment of the first conduit, and the second conduit extending rearwardly of the first conduit, wherein the first material is more rigid than the second material.

12. The strain relief boot according to claim 1, wherein the second material comprises an elastomer.

13. The strain relief boot according to claim 1, wherein the second conduit comprises an inner width that is at least 2.9 mm.

14. The strain relief boot according to claim 1, wherein the second conduit comprises at least one channel configured to increase the flexibility of at least a portion of the second conduit.

15. The strain relief boot according to claim 1, wherein the at least one projection has a height substantially equal to a thickness of the second conduit such that the at least one projection is visible from an outside of the second conduit.

16. A fiber optic connector, comprising:
   a ferrule configured to support at least one optical fiber;
   a ferrule holder from which the ferrule extends;
   a housing in which the ferrule holder is positioned; and
   a strain relief boot extending from an end of the housing, the strain relief boot comprising:
      a first conduit comprising at least a first material, the first conduit including a front segment and a rear segment, wherein the front segment of the first conduit has a first outer width and the rear segment has a second outer width that is less than the first outer width, the rear segment comprising:
         at least one discontinuity configured such that the rear segment is more flexible than the front segment, and
         at least one projection extending outwardly from the rear segment at a location adjacent to the at least one discontinuity; and
      a second conduit comprising at least a second material, the second conduit at least partially surrounding at least the rear segment of the first conduit, and the second conduit extending rearwardly of the first conduit, wherein the first material is more rigid than the second material.

17. A fiber optic cable assembly comprising:
   a fiber optic cable having at least one optical fiber; and
   a fiber optic connector installed on the fiber optic cable, the fiber optic connector comprising:
      a ferrule configured to support at least one optical fiber;
      a ferrule holder from which the ferrule extends;
      a housing in which the ferrule holder is positioned; and
      a strain relief boot extending from an end of the housing, the strain relief boot comprising:
         a first conduit comprising at least a first material, the first conduit including a front segment and a rear segment, the rear segment comprising:
            at least one discontinuity configured such that the rear segment is more flexible than the front segment, and
            at least one projection extending outwardly from the rear segment at a location adjacent to the at least one discontinuity; and
         a second conduit comprising at least a second material, the second conduit at least partially surrounding at least the rear segment of the first conduit, and the second conduit extending rearwardly of the first conduit, wherein the first material is more rigid than the second material;

wherein the fiber optic cable passes through the strain relief boot and has a diameter within the range from about 900 μm to about 2.9 mm, and further wherein the strain relief boot is configured to maintain at least a 10 mm bend radius in the fiber optic cable when the fiber optic cable is subject to at least 0.5 lbf perpendicular to the longitudinal axis.

18. The fiber optic cable assembly according to claim 17, wherein the front segment of the first conduit has a first outer width and the rear segment has a second outer width that is less than the first outer width.

19. The fiber optic cable assembly according to claim 17, wherein the fiber optic cable further comprises at least one strength member, and further wherein the front segment of the first conduit comprises at least one internal thread engaging the at least one strength member.

20. The fiber optic cable assembly according to claim 17, wherein the fiber optic cable has a diameter less than about 1.6 mm, and further wherein the second conduit has an inner width that is at least about 2.9 mm.

21. The fiber optic cable assembly according to claim 20, wherein the fiber optic cable has a diameter of about 900 μm.

22. The fiber optic cable assembly according to claim 17, wherein:
the strain relief boot is configured to maintain at least a 10 mm bend radius in the fiber optic cable when:
the strain relief boot is attached to the fiber optic cable assembly;
the fiber optic cable has a diameter of about 2.9 mm; and
the fiber optic cable is subject to about 4.4 lbf perpendicular to the longitudinal axis of the fiber optic connector.

* * * * *